TRANSLATOR DEVICE FOR AUTOMATIC TELEPHONE SYSTEM

Filed April 20, 1959

INVENTORS
PETER H. BENNETT
EDWARD E. BAUMAN
BY Brown, Jackson, Boettcher & Dienner 3,046,351
Patented July 24, 1962

3,046,351

TRANSLATOR DEVICE FOR AUTOMATIC TELEPHONE SYSTEM

Peter H. Bennett and Edward E. Bauman, Galion, Ohio, assignors to North Electric Company, Galion, Ohio, a corporation of Ohio Filed Apr. 20, 1959, Ser. No. 807,369
7 Claims. (Cl. 179—18)

Figure 1:
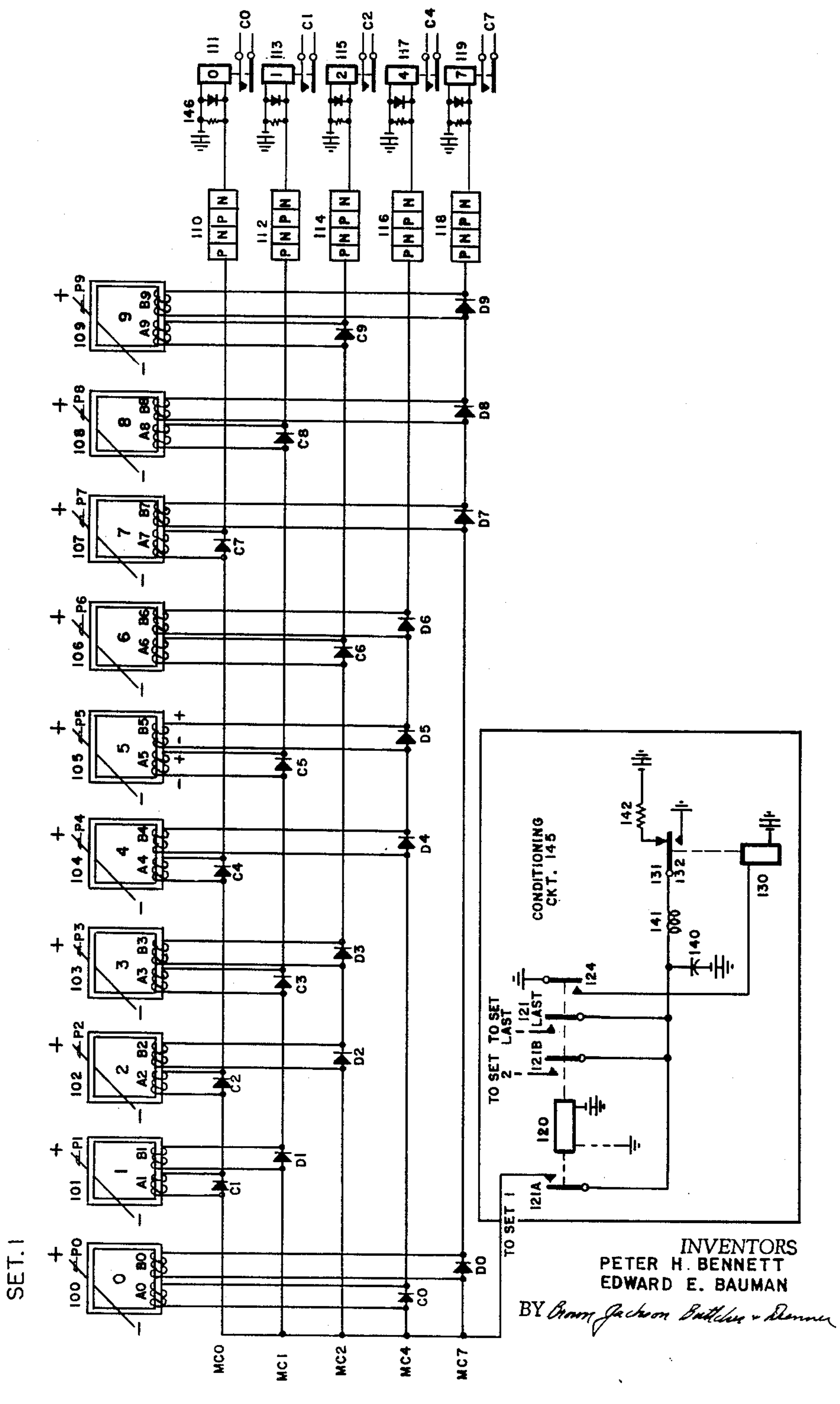

The present invention relates to a novel switching arrangement, and particularly to a novel switching arrangement for use in translator equipment in an automatic telephone system.

With the recent development of novel electronic components, many new and novel switching techniques have been developed for inclusion in automatic telephone systems for the purpose of providing more efficient and reliable telephone service. Similar modifications and improvements in switching techniques have also been made in other fields which utilize complex switching equipment, such as for example, computer equipment, multiplex telegraphy equipment, telemetering equipment, and the like. In the provision of many of the improved switching arrangements, however, the additional cost has proven somewhat expensive and costly, and as a result, there has been a continuing search for switching arrangements which will accomplish the improved type of operation with fewer components in a more economical manner.

In one specific application in the automatic telephone field of the crossbar type, for example, the location of a subscriber line on the switching frame is rendered independent of the directory number by an arrangement commonly called a "number group circuit" which is operative to translate the directory number of a subscriber line into signal information representing the location of the line on the switching frame for the purpose of controlling associated equipment in the selection thereof. It was accepted practice in the establishment of certain connections between subscribers of certain of such type crossbar systems to utilize a complicated switching arrangement to effect the location of the called subscriber line equipment on the switching frame. Moreover, the equipment was normally such that each change in the relation between the directory number of a line and the location of the line equipment on the switching frame involved a time consuming operation as well as considerable expense to the exchange operator, and as a result various forms of arrangements were developed for the purpose of minimizing the cost of such changes.

In one such arrangement, a plurality of conductors or jumpers are provided each of which represents a directory number in the number group circuit. As an incoming set of impulses representative of the digits of a directory number is received, a set of switching relays selects the one of the jumpers which represents such directory number and transmits a surge of current thereover. Each jumper is threaded through a combination of coils (each of which coils has a secondary winding coupled to an associated gas tube), the combination of coils threaded by the jumpers being identified with the location of the line equipment on the frame. Thus, as a surge of current is coupled to a jumper, the output windings of each of the coils through which the jumper is threaded are energized, and the tubes connected to such windings are fired. Each of the gas tubes in turn controls interconnected relays in the marker, and the combination of relays thus operated effects marking of the location of the line equipment on the frame. The translation of the directory number of the line into information which indicates the frame location of the terminal equipment for the line in such manner requires a substantial amount of equipment, and an extremely complex pattern of interconnection of relay members.

It is a primary object of the present invention therefore to provide a new and novel translator device for use in the number group equipment in an automatic telephone system at a substantial reduction in cost, while yet providing reliable and expeditious subscriber service, and a more simplified manner of changing the relation between the directory number of a subscriber line and the location of its line equipment in the system.

It is a specific object of the invention to provide a new and novel switching arrangement for use in translator equipment which effects the selection of different ones of a plurality of circuits with a minimum amount of equipment, and which is also readily adaptable for use in various forms of complex switching arrangements.

It is a further specific object of the invention to provide a switching arrangement of such type which utilizes inexpensive components to provide a translator arrangement for translating numbers from a decimal code to a so-called "two-out-of-five" code; that is, a code which uses five marking members to represent the value of ten different numbers, the five marking members being marked in different pairs to represent correspondingly different ones of the ten decimal numbers. As will be apparent, the translation of a directory number from the decimal code to the two-out-of-five code in the number group results in a substantial saving in the amount of switching equipment required in the exchange.

The novel translator unit basically comprises a plurality of groups of switching sets which is equivalent in number to the number of signals required to designate the equipment location of the called station and such other information which is necessary to complete the call. Each switching set basically comprises a plurality of groups of ferrite cores, each group having ten cores, each of which cores represents a different one of the decimal numbers 1–0. Each core has at least one primary conductor (and as shown hereinafter, in actual practice a large number of conductors) threaded therethrough and two secondary windings wound thereon, each pair of secondary windings being connected to two conductors of a set of five marking circuits, the pair of windings for different cores being connected to different conductor pairs. Each of the five marking circuits includes a marking conductor, a voltage sensitive device (a four layer semiconductor diode) and a switching member, such as a relay. As a translation operation is to be effected, a conditioning circuit preconditions each of the five marking circuits by connecting a source of potential thereto. With the subsequent energization of the primary conductor of one of the cores by a trigger pulse, the pair of secondary coils on such core are operative to couple a pulse of a polarity and amplitude to the interconnected marking circuits, which pulse is of a value sufficient to control the associated one of the voltage sensitive devices to operate the relays of such circuits. With the termination of the trigger pulse, the potential source maintains the voltage sensitive devices and the associated relays operated until such time as the conditioning circuit is interrupted. Each relay member of a switching set includes a single marking contact set, the relays as operated in pairs being effective at the associated contact sets to provide a two-out-of-five code marking thereover to associate equipment.

As shown hereinafter, each directory number is represented in the translator by a single jumper, the jumper for a line being threaded through the ones of the coils in the various switching sets which represent the digital markings required to provide the terminal location of the called station, the jumper thereby constituting a primary winding for such cores. Ostensibly, as a jumper is energized, the core in each set which is associated therewith is energized to operate a corresponding set of relays, and thereby provide a code signal in the two-out-of-five code.

It is apparent that the novel arrangement wherein a directory number is represented by a single conductor which is passed through one ring of each of a plurality of sets of rings, and in which a translation is made which indicates the location of the terminal equipment in a two-out-of-five code with a number of inexpensive components, materially reduces the complexity and cost of the switching equipment. Additionally, the use of four layer diodes as switching devices in such arrangement provides an inexpensive arrangement for interconnecting the ferrite cores to the relay members without requiring the complicated biasing means which are common to transistor systems, or the high voltage power sources which are required for cold cathode tubes, whereby a further reduction in purchase and maintenance costs is provided.

These and other advantages and features of the invention will be apparent with reference to the following specification, claims, and the drawing which sets forth the translator device schematically, and in detail, one of the novel switching sets of the translator device.

*Specific Circuit Description*

As noted above, the novel translator device comprises a plurality of novel switching sets interconnected to effect the translation of each of a plurality of directory numbers to equipment locations in a two-out-of-five code. With reference to the drawing, it will be apparent that each switching set comprises a set of ten ferrite rings 100–109, each of which is assigned to represent a different one of the ten decimal values 0–9. As noted above, each directory number in the translator device is represented by an individual jumper which is threaded through the one of the ferrite rings of each set which corresponds to the value of the different digit representing equipment location. A jumper in its passage through a core constitutes a primary winding for such core, it being apparent therefrom that each core may have a plurality of primary windings. As shown in the drawings, each core also includes a pair of secondary windings, such as A0, B0, which are wound in a manner related to the polarity of pulses which are coupled to the jumper associated therewith, the nature of the polarity being indicated by the plus and minus symbols in the drawings.

Each pair of secondary coils A0, B0, etc., of each core 100, etc., are in turn connected to a pair of the five marking conductors MC0, MC1, MC2, MC4, MC7, the coil pairs of different cores being connected to different pairs of the marking conductors according to the two-out-of-five marking code which in one embodiment may comprise:

| Core: | Marking conductor |
|---|---|
| **0** | MC4 and MC7 |
| **1** | MC0 and MC1 |
| **2** | MC0 and MC2 |
| **3** | MC1 and MC2 |
| **4** | MC0 and MC4 |
| **5** | MC1 and MC4 |
| **6** | MC2 and MC4 |
| **7** | MC0 and MC7 |
| **8** | MC1 and MC7 |
| **9** | MC2 and MC7 |

A rectifier member, such as C0, is connected between the connecting points of each coil, such as A0, to its associated marking conductor, such as MC4.

Each switching set includes five marking circuits, each of which includes rectifiers such as C1, C2, C4 and C7, a four layer diode, such as 110, and a marking relay, such as 111, connected in series with its marking conductor, such as MC0. A resistor-rectifier circuit 146 is coupled in parallel with each marking relay, such as 111.

A conditioning circuit 145 is controlled to prepare the seven switching sets for operation in response to the selection of the number group equipment for translation purposes by the exchange switching equipment, and basically comprises preparation relays 120, 130 which are operative as energized to couple the marking circuits for each of the sets to a source of potential, such potential being coupled over contacts 132, LC network 140, 141, and contacts 121A to 121-last to the five marking conductors MC0, MC1, MC2, MC4, MC7 in each of the seven sets. The conditioning voltage is of a value to initially enable the diodes as high resistance members, and of a value to maintain the diodes in the low resistance state as subsequently operated to such state by the coupling of an enabling pulse to the marking circuit for the diode.

As shown hereinafter, the LC circuit 140, 141 provides a delay in the rise time of the conditioning voltage which is coupled to the marking circuits to prevent false triggering of the four layer diodes 110, 112, etc., prior to coupling of the enabling pulses to the marking circuits by the core members. A discharge circuit including inductance 141 and resistance 142 is connected to capacitor 140 of each of the sets subsequent to the restoration of the equipment following each translating operation to prepare same for a subsequent operation.

*Specific Description of Circuit Operation*

It is now assumed for exemplary purposes, that the switching equipment receives impulses representative of the line having directory number LA2–5088, and that such directory number is to be translated into a signal in the two-out-of-five code representative of the equipment location. The exchange switching equipment is thereupon operative in the conventional manner to complete an enabling circuit to the translation equipment, such circuit effecting the completion of an energizing circuit for relay 120 of the conditioning circuit 145. Since such enabling circuits are well known in the art, the energizing circuit for relay 120 is indicated schematically in the drawings.

Relay 120 operates, and at its contacts **121*a* to 121–last prepares enabling circuits for each of the switching sets (set 1–set last), and at its contacts 124 completes an energizing circuit for preparatory relay 130. Relay 130 operates, and at its contacts 132 connects positive potential over LC circuit 140, 141 and contacts 121*a* to 121–last to the marking conductors MC0–MC7 for each of the seven switching sets. With the coupling of positive potentials to the marking conductors, the rectifiers C0–C9, D0–D9 of each set are rendered conductive, whereby the potential of the source (approximately 48 volts in the telephone system) is coupled across the four layer diodes 110, 112, 114, 116, 118 of each set to energize same in the high resistance state. The circuit for the four layer diode 110, for example, extends from positive battery over contacts 132, inductance 141, contacts 121*a*, marking conductor MC0, rectifiers C1, C2, C4, C7, four layer diode 110 (from P to N to P to N), and the resistor across the winding of relay 111 to negative battery. In that the resistance of the four layer diode 110 is extremely high, essentially all of the battery potential appears across the diode, and practically no current flows in the circuit. Relay 111 accordingly remains in the non-operating condition. It will be apparent from such description that relays 111, 113, 115, 117 and 119** in each of the switching sets are therefore in the non-operated condition at this time.

The exchange switching equipment now couples a trigger pulse to the jumper which represents the station having directory number LA2–5088 to effect translation to an equipment location. For purposes of example it is assumed that the terminal location of such station is represented by digits 5675, and accordingly the jumper is threaded through core 105 of the illustrated switching set I, core 106 of switching set II (not shown), core 107 of switching set III (not shown), and core 105 of switching set IV (not shown), the trigger pulse having the polarity indicated in the drawing. The manner in which the different switching sets are operative in combination to effect translation of the directory number in a decimal code to equipment location in a two-out-of-five code will be apparent from the following description which refers to the specific operation of the components of the illustrated switching set I.

As the steep front trigger pulse rises and decays in the jumper for the line LA2–5088 (which extends through the fifth core 105 of switching set I), the voltage across secondary windings A5 and B5 of the fifth core rises to a peak in one direction and decays with the illustrated polarity, and as a result of the inductance of the coils A5, B5, results in a second pulse which rises to a peak in the opposite direction and then decays. The voltage of the first half of the pulse which occurs in the secondary coils A5, B5 is effective with the battery voltage which is coupled to conductors MC0, MC1, etc., to provide a pulse having a peak voltage of approximately 128 volts, which pulse is coupled over marking conductors MC1 and MC4 to the four layer diodes 112 and 116. In that four layer diodes 112 and 116 are operative to pass through their so-called avalanche point at approximately 80 volts, the resistance of the diodes will be rapidly reduced to an extremely low value as the value of the pulse exceeds 80 volts, and the diodes 112, 116 are thereupon operative to conduct an increased current thereover. Such paths initially extend over the resistors associated with relays 113 and 117.

The increased current flow is applied over the winding of relay 113, the circuit extending from ground over contacts 132, inductance 141, contacts 121*a*, conductor MC1, rectifiers D1, C3, coil A5 on core 105 (rectifier C5 being nonconductive at this time by reason of the polarity of the pulse output of coil A5), rectifier C8, four layer diode 112, the resistor in parallel with relay 113 to negative battery, the rectifier connected in parallel with relay 113 being poled to prevent passage of such current thereover. As the voltage of the first half of the secondary pulse decreases towards zero, rectifier C5 becomes conductive. As the inductance of relay 113 is overcome, current passes over the relay 113 as well as its associated resistor to effect the operation thereof. Relay 117 is operated in a similar manner.

With the operation of relays 113 and 117, and the closure of associated contact C1 and C4, the desired signal in the two-out-of-five code is coupled to the associated equipment. The other switching sets are operative in a like manner to couple signals in the two-out-of-five code to the associated equipment.

It will be apparent from the foregoing description that the rectifiers, such as C5, D5, which are connected in series with the marking conductor circuits are operative to prevent the energization of the coils at an improper time in the marking operation, and also to prevent the coils from dissipating the voltage which is available for triggering the four layer diodes. Thus, the circuit which extends over marking conductor MC1 in the manner described will be extended over rectifiers D1, C3 and C8 without resulting in the passage of course over coil B1, A3, A8 and the improper induction of a current pulse in the cores associated therewith. The voltage of the second half of the secondary pulse is of a polarity to cause a reversal of the plus and minus signs indicated in the drawings, whereby rectifiers C5 and D5 will now become conductive to thereby shunt or clip the secondary portion of the induced pulse to prevent the application thereof of the marking circuit.

After termination of the induced pulse, battery voltage alone coupled from the source to the marking circuit maintains the energized ones of the four layer diodes in each of the switching sets in the low resistance conducting condition, and the operated ones of the relays, such as 113, 117 in switching set I, are maintained in the operated condition. A particular feature of the invention is the manner in which such circuit maintains the desired marking arrangement subsequent to the termination of the trigger pulse without requiring a series of locking relay contacts. In accordance with the known operating characteristics of the four layer diodes, the diodes are maintained in the low resistance region as long as a minimum current is coupled thereto, and such current flow continues for the period that the above-described circuit is maintained.

As the translating operation is completed, the automatic switching equipment interrupts the energizing circuit for relay 120 in conditioning circuit 145 to restore same. As relay 120 restores, it is effective at its contacts 121 to 121- last to interrupt the sustaining circuit for the enabled ones of the four layer diodes in each of the switching sets, whereby the diodes return to their normal high resistance condition and interrupt the current flow to the operated ones of the relays in the different switching sets to restore same. Relay 120 at its contacts 124 interrupts the holding circuit for conditioning relay 130, which restores, and at its contacts 132 further interrupts the enabling circuit for the different switching sets, and at its contacts 131 completes a discharge circuit for the capacitance member 140, the discharge circuit extending from capacitor 140 over inductance 141, contacts 131, resistance 142 through the battery back to the capacitor. The delay circuit 140, 141 is thus conditioned for operation with a subsequent seizure of the conditioning circuit to provide the necessary delay in the rise time of the conditioning potential which is to be coupled to the marking conductors of each of the sets.

As the energized ones of the marking relays, such as 113, 117, in each of the switching sets are restored, the rectifiers which are coupled thereacross permit the surge current of the associated relays to pass thereover, whereby the four layer diodes connected thereto are protected against rupture from voltage buildup over sneak circuits.

In one successful embodiment the components of the circuit included in each switching set were as follows:

Inductive rings:
  Type—General Ceramics Company F410.
Primary conductor:
  No. 24 or 26 insulated copper wire.
Secondary windings:
  72 turns each of No. 26 or 28 insulated copper wire.
Rectifiers across coils and relay:
  IN600.
Four layer diodes:
  4N 80 D (approximately 80 volts avalanche; 5 ma. hold) Shockley Transistor Corp.
Relays 111–119:
  North Electric Company RAF telephone type, 2500 ohms, moderately sensitive relay; operating on about 11 ma., and non-operating on about 6 ma.
Resistors across relays 111–119:
  1K.
Battery potential:
  48 volts.
Characteristic of signal through primary:
  2½ ms., ½ amp., 48 volts maximum.
Delay network:
  575 turns of #28 enameled copper wire wound on ⅜" bobbin with air core, this winding having 7.5 ohms resistance and 3.3 millihenries of inductance.
Capacitance:
  100 microfarad electrolytic telephone grade capacitor.
Relays 120 and 130:
  North Electric Company telephone type 1000 ohms of normal sensitivity operating on approximately 25 ma., and non-operating on approximately 10 ma.

*Conclusion*

It will be apparent that a new and novel translating device set forth herein includes a series of novel switching sets which make possible a more simplified and inexpensive arrangement for effecting translation from a directory number to equipment location in the process of which translation from a decimal code to a two-out-of-five code is employed in a reliable and expeditious manner. It is further apparent that such translation which is effected by threading a single jumper through an appropriate ring in each of a number of switching sets to effect translation from the directory number to terminal equipment location, provides a system in which the directory numbers in the system are readily assigned and changed with a minimum of expense. Moreover the novel switching sets which form a basic part of the translator equipment ostensibly have advantage and use in many other forms and types of switching equipment, and such applications are believed to be clearly within the scope of the present invention.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. In a translator device for use in an automatic telephone system including a plurality of switching sets connected to translate digits in the decimal code to information in a two-out-of-five code, a plurality of marking circuits in each switching set, each of which marking circuits is comprised of a series connected marking conductor, a four layer diode, and a switching member, conditioning means including potential supply means for coupling a conditioning potential to said marking circuits preparatory to each translating operation, including a delay circuit for reducing the steepness of the waveform of the conditioning potential, and means for connecting said delay circuit between said marking circuits and said potential supply means, means for selectively coupling an enabling-pulse to at least one marking conductor and the diode connected thereto, and means in said diode operative to complete an energizing circuit for its series connected switching member in response to coupling of said enabling pulse thereto.

2. In a translator device as set forth in claim 1 in which said delay circuit includes an inductance and a capacitor member, and in which said potential supply means includes means operative to interrupt said conditioning potential and to connect said delay circuit to said discharge circuit subsequent to the termination of each translating operation.

3. In a translator device for use in an automatic telephone system including a plurality of switching sets connected to translate digits in the decimal code to a two-out-of-five code, each of said switching sets comprising a plurality of marking circuits, each of which marking circuits is comprised of a marking conductor, a four layer diode and a switching member, means for coupling said marking conductor, said four layer diode and said switching member to a conditioning potential source of a value to energize said diode in a high resistance condition preparatory to a translating operation, and inductive means for coupling an enabling pulse to at least one marking conductor to effect energization of the associated diode in a low resistance state and thereby operation of the interconnected switching member including a core, a primary circuit for said core, a secondary circuit for said core, means connecting said secondary circuit to at least one marking conductor including a rectifier member connected across said secondary circuit in series with said marking conductor, and means for coupling a trigger pulse to said primary circuit to effect coupling of a pulse by said secondary circuit to said marking conductor to thereby operate said diode to said low resistance state.

4. In a translator device as set forth in claim 3 which includes a rectifier and a resistor network, and means for coupling said network in parallel with said switching member.

5. In a translator device for use in automatic telephone systems for extending connections between subscriber lines, each of which is preassigned a terminal location in the system, and which includes a plurality of switching sets connected to translate digits in the decimal code to signals in a two-out-of-five code, each of said switching sets comprising a plurality of marking circuits, each of which marking circuits is comprised of a marking conductor, a voltage sensitive element and a switching member, means for coupling a potential to said marking circuit to energize said voltage sensitive element in a high resistance state preparatory to each translating operation, and selection means for selectively coupling enabling pulses to the voltage sensitive elements in the marking circuits in different combinations to effect energization of the associated voltage sensitive elements in a low resistance state and operation of the associated switching members comprising a plurality of code representative cores for each switching set, a jumper for each subscriber line coupled to the one of the cores in each of the different sets which correspond to the terminal location of the subscriber line; a pair of secondary windings on each core coupled to a pair of said marking conductors, different pairs of secondary windings being coupled to different pairs of conductors to provide a two-out-of-five marking pattern, and means for selectively coupling a trigger pulse to the different jumpers to effect energization of the ones of the cores and marking circuits which are coupled thereto.

6. In a translator device for translating digits in the decimal code to a two-out-of-five code for use in an automatic telephone system, a plurality of digit-representative cores, each of which cores is assigned to represent a predetermined digit in the decimal code, at least one primary conductor for each of said cores, a pair of secondary windings on each core, a plurality of five marking circuits preassigned for energization in pairs, each different pair representing a different digit in a two-out-of-five marking pattern, means for connecting each pair of secondary windings on said cores to the two marking circuits which represent the decimal digit for the core in the two-out-of-five code, whereby each of said marking circuits is connected to a plurality of secondary windings, and signal means coupled to said marking circuits operative responsive to energization of each pair of marking circuits to provide signals representative of the corresponding digit in the two-out-of-five code.

7. In a translator device for translating digits in the decimal code to a predetermined code for use in an automatic telephone system, a plurality of digit-representative cores, each of which cores is assigned to represent a predetermined digit in the decimal code, at least one primary conductor for each of said cores, a plurality of secondary windings on each core, a plurality of marking circuits preassigned for energization in groups of a predetermined number, each different group representing a different digit in said code, means for connecting each plurality of secondary windings on said cores to the marking circuits which represent the decimal digit for the core in said code, whereby each of said marking circuits is connected to a plurality of secondary windings, and signal means coupled to said marking circuits operative responsive to energization of each group of marking circuits to provide signals representative of the corresponding digit in said predetermined code.

References Cited in the file of this patent

UNITED STATES PATENTS

| | | |
|---|---|---|
| 2,599,358 | Cahill et al. | June 3, 1952 |
| 2,834,836 | Hartley | May 13, 1958 |
| 2,883,469 | Branch et al. | Apr. 21, 1959 |